US008775282B1

(12) United States Patent
Ward, Jr. et al.

(10) Patent No.: US 8,775,282 B1
(45) Date of Patent: Jul. 8, 2014

(54) CAPACITY MANAGEMENT OF DRAINING-STATE PLATFORMS PROVIDING NETWORK-ACCESSIBLE RESOURCES

(75) Inventors: David John Ward, Jr., Seattle, WA (US); Bradley D. Roberts, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/475,461

(22) Filed: May 18, 2012

(51) Int. Cl.
*G06Q 30/04* (2012.01)
*H04L 29/06* (2006.01)

(52) U.S. Cl.
USPC ............................ 705/34; 709/224; 709/226

(58) Field of Classification Search
USPC .................. 718/1; 705/400, 34; 709/224, 226
See application file for complete search history.

(56) References Cited

U.S. PATENT DOCUMENTS

| | | | |
|---|---|---|---|
| 7,743,001 B1 * | 6/2010 | Vermeulen et al. ........... | 705/400 |
| 7,870,044 B2 | 1/2011 | Robertson | |
| 8,055,493 B2 | 11/2011 | Rolia et al. | |
| 2008/0080396 A1 | 4/2008 | Meijer et al. | |
| 2009/0049114 A1 | 2/2009 | Faraj | |
| 2009/0300635 A1 | 12/2009 | Ferris | |
| 2010/0050172 A1 * | 2/2010 | Ferris ................................ | 718/1 |
| 2010/0131624 A1 | 5/2010 | Ferris | |
| 2010/0131649 A1 | 5/2010 | Ferris | |
| 2010/0217865 A1 | 8/2010 | Ferris | |
| 2010/0306379 A1 | 12/2010 | Ferris | |
| 2011/0119104 A1 | 5/2011 | Levine et al. | |
| 2011/0131335 A1 | 6/2011 | Spaltro et al. | |
| 2011/0137805 A1 | 6/2011 | Brookbanks et al. | |
| 2011/0138050 A1 | 6/2011 | Dawson et al. | |
| 2011/0138051 A1 | 6/2011 | Dawson et al. | |
| 2011/0145392 A1 * | 6/2011 | Dawson et al. ............... | 709/224 |
| 2011/0161964 A1 | 6/2011 | Piazza et al. | |
| 2011/0173038 A1 | 7/2011 | Moon et al. | |
| 2011/0173626 A1 | 7/2011 | Chi et al. | |
| 2011/0179132 A1 | 7/2011 | Mayo et al. | |
| 2011/0202657 A1 | 8/2011 | Chang | |
| 2011/0213691 A1 | 9/2011 | Ferris et al. | |
| 2011/0213712 A1 | 9/2011 | Hadar et al. | |
| 2011/0238458 A1 | 9/2011 | Purcell et al. | |
| 2011/0295998 A1 | 12/2011 | Ferris | |

OTHER PUBLICATIONS

"Amazon EC2 Spot Instance," Amazon Web Services LLC, Downloaded Mar. 26, 2012, 11 pages.

(Continued)

*Primary Examiner* — Matthew Gart
*Assistant Examiner* — Reva R Danzig
(74) *Attorney, Agent, or Firm* — Robert C. Kowert; Meyertons, Hood, Kivlin, Kowert & Goetzel, P.C.

(57) ABSTRACT

Methods and apparatus for capacity management of draining-state platforms providing network-accessible resources are disclosed. A system includes computing platforms configurable to host a plurality of resource instances, and a resource manager. The resource manager determines that a particular computing platform is in a draining state, wherein, in accordance with its designation as being in the draining state, the particular platform is currently hosting at least one uninterruptible resource instance and is temporarily unavailable to launch additional uninterruptible resource instances. In response to (a) a determination that the particular computing platform in the draining state has sufficient available computing capacity for at least one resource instance and (b) an instance activation request from a client, the resource manager launches an interruptible resource instance on the particular computing platform.

24 Claims, 9 Drawing Sheets

(56) References Cited

OTHER PUBLICATIONS

"Amazon EC2 Instance Types," Amazon Web Services LLC, Downloaded Mar. 26, 2012, 5 pages.
"Amazon EC2 Reserved Instances," Amazon Web Services LLC, Downloaded Mar. 26, 2012, 6 pages.
"Amazon EC2 Instance Purchasing Options," Amazon Web Services LLC, Downloaded Mar. 26, 2012, 2 pages.
"Amazon EC2 Pricing," Amazon Web Services LLC, Downloaded Mar. 26, 2012, 8 pages.
U.S. Appl. No. 13/331,750, filed Dec. 20, 2011, Amazon Technologies, Inc., all pages.
U.S. Appl. No. 13/535,720, filed Jun. 28, 2012, Matthew D. Klein, et al.
U.S. Appl. No. 13/535,715, filed Jun. 28, 2012, Matthew D. Klein, et al.
U.S. Appl. No. 13/535,707, filed Jun. 28, 2012, Matthew D. Klein, et al.
U.S. Appl. No. 13/535,725, filed Jun. 28, 2012, Matthew D. Klein, et al.
AWS Documentation, "Using Cluster Instances," downloaded from docs.amazonwebservices.com/AWSEC2/latest/UserGuide/using_cluster_computing.html on May 16, 2012, pp. 1-6.
Amazon Web Services: AWS Products & Solutions, "High Performance Computing (HPC) on AWS," downloaded from aws.amazon.com/hpc-applications/ on May 16, 2012, pp. 1-3.
Timo Schneider (personal website), "An Oblivious Routing Congestion Simulator," downloaded from perlplexity.org/Research/ORCS/ on May 16, 2012, pp. 1-8.
U.S. Appl. No. 13/431,379, filed Mar. 27, 2012, David John Ward, Jr.
U.S. Appl. No. 13/431,388, filed Mar. 27, 2012, David John Ward, Jr., et al.
U.S. Appl. No. 13/429,957, filed Mar. 26, 2012, David John Ward, Jr., et al.
U.S. Appl. No. 13/431,355, filed Mar. 27, 2012, David John Ward, Jr.
U.S. Appl. No. 13/429,985, filed Mar. 26, 2012, David John Ward, Jr., et al.
U.S. Appl. No. 13/431,348, filed Mar. 27, 2012, David John Ward, Jr.
U.S. Appl. No. 13/431,360, filed Mar. 27, 2012, David John Ward, Jr.
U.S. Appl. No. 13/430,003, filed Mar. 26, 2012, David John Ward, Jr., et al.
U.S. Appl. No. 13/431,393, filed Mar. 27, 2012, David John Ward, Jr.
U.S. Appl. No. 13/475,399, filed May 18, 2012, David John Ward, Jr.
U.S. Appl. No. 13/475,359, filed May 18, 2012, David John Ward, Jr.
U.S. Appl. No. 13/461,605, filed May 1, 2012, David John Ward, Jr., et al.
U.S. Appl. No. 13/476,828, filed May 21, 2012, David John Ward, Jr., et al.

* cited by examiner

800

Instance Launch Page https://<website>.com/launchInstance

Dear John Doe, welcome to the Instance Launch Page! ← 803

Please provide details of the instance you would like to launch

805

| | | |
|---|---|---|
| Instance size (e.g., small/medium/large) | Medium (default) | ← 807 |
| Availability zone | AZ-002 U.S East Coast (default) | ← 809 |
| Instance type | Draining mode | ← 811 |
| Maximum price you are willing to pay | | ← 813 |
| For approximately how long would you like to use this instance? | 1 hour (default) | ← 815 |
| If we have to interrupt this instance, how much advance notice would you prefer? | 15 minutes (default) | ← 817 |
| If we have to interrupt this instances, how would you like to be notified? | Text message to this number (default) | ← 819 |

Submit ← 891

*Figure 8*

CAPACITY MANAGEMENT OF DRAINING-STATE PLATFORMS PROVIDING NETWORK-ACCESSIBLE RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes, and with different allocation interruptibility characteristics. For example, a customer may reserve a virtual compute resource instance for a relatively long duration, such as one year or three years, with a guarantee that the customer will be provided access to that instance for the specified duration, and that (barring emergency situations) access to that instance will not be revoked for that specified duration. Alternatively, a customer may purchase resource instances for shorter terms on an ad-hoc basis as needed; in some cases such short term resource allocations may be extended at will by the customer, with a revocation policy in effect that ensures that until the client wishes to terminate an instance, the client will continue to have uninterrupted access. In yet another scenario, resource instances may be allocated in an interruptible mode in a marketplace where price varies based on supply and demand, so that for example clients willing to have their access revoked under certain conditions (e.g., if a higher bid is received for the instance) can potentially take advantage of lower prices. Resources may be parceled out to users in different capacity units or bundles—e.g., several different compute instance sizes or performance levels may be supported. Often, some or all of the underlying platforms (such as hardware servers combined with virtualization software) set up by the provider network operator may each be capable of supporting multiple resource units, of which only a few may be activated at any given point in time. In certain situations, planned configuration changes to such platforms may result in an underutilization of the platform capacity, thereby reducing the returns on infrastructure investment of the provider network operator.

BRIEF DESCRIPTION OF THE DRAWINGS

FIG. 8 illustrates a portion of an example web-based interface that may be implemented to allow clients to request draining-mode instances, according to some embodiments.

Figure 1:
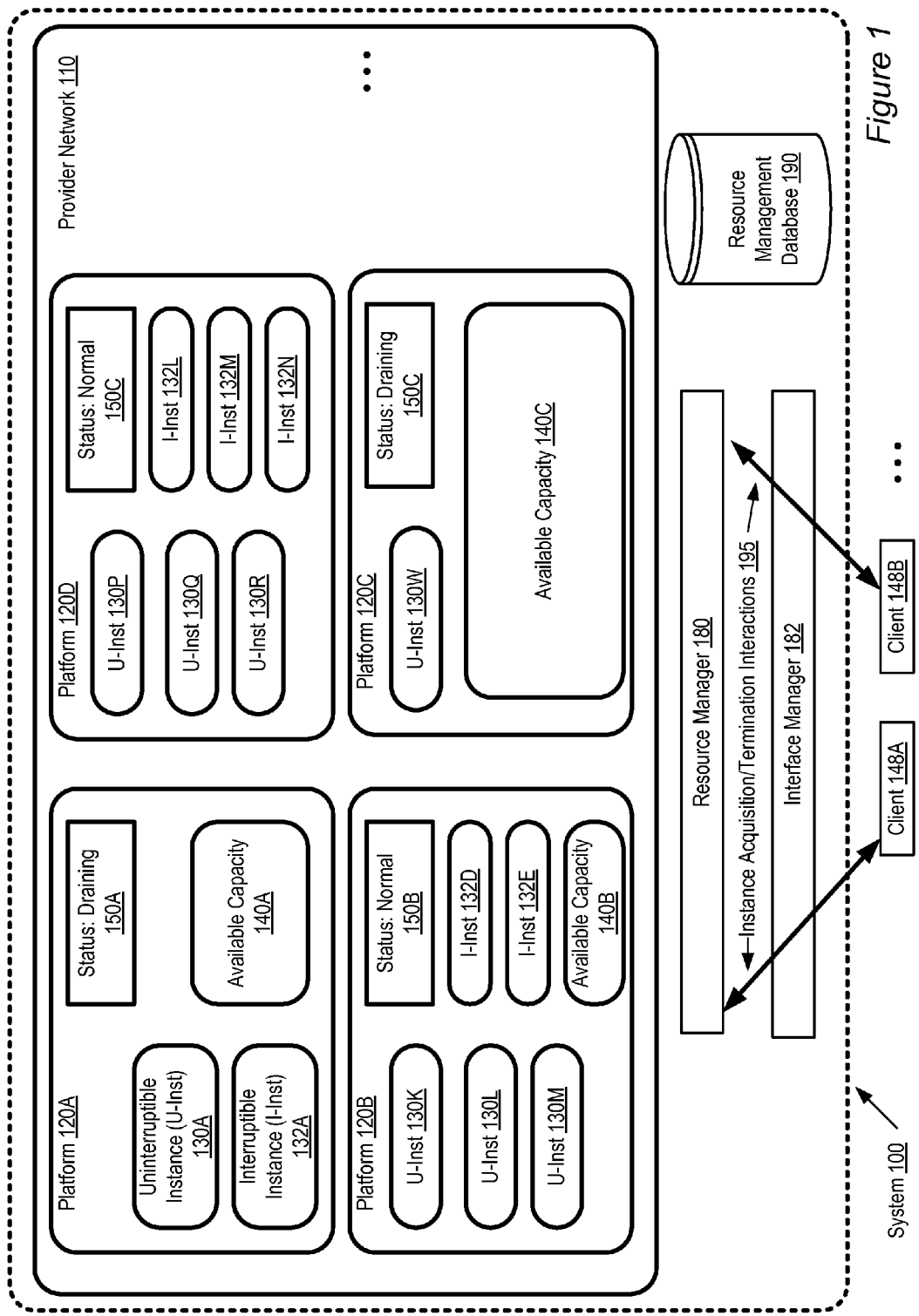
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for capacity management of draining-state platforms providing network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers, each comprising potentially large numbers of computing platforms, such as collections of physical and/or virtualized computer servers, storage devices, networking equipment and the like, needed to implement and distribute the infrastructure and services offered by the provider. In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing platforms may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, an interface manager of the provider network may implement a programmatic interface (e.g., via a web site or a set of web pages, or one or more application programming interfaces (APIs)) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, revocation policies, and so on. The requests received via the interface or interfaces may be handled by a resource manager, and the responses to the requests may be transmitted via one or more of the interfaces back to the requesting client. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. When using an instance obtained in on-demand mode, the client may be allowed to extend the allocation period as needed, and thus maintain client access to the instance until the client voluntarily relinquishes access (e.g., by terminating the instance). Similarly, in the case of a long-term reserved instance, a client may have uninterrupted access to the instance for the term of the reservation, and may at least in some embodiments renew the reservation to extend its access to the instance. Such instance allocations, in which the client controls how long it accesses a resource instance and when the instance is terminated, may be termed "uninterruptable" instance allocations herein, and the corresponding instances may be referred to as "uninterruptible" instances.

In contrast, some pricing modes may be associated with interruptible instance allocations. In the spot-price mode, for example, a client could specify the maximum price per unit time that it is willing to pay for a particular type of resource instance, and if the client's maximum price exceeded a dynamic spot price determined at least in part by supply and demand, that type of instance would be provided to the client. If, however, the spot price rises above the maximum price the client is willing to pay, access to the instance by that client may be revoked—e.g., the instance may be terminated, with or without advance notification to the client depending on the exact details of the revocation policies in effect. Such instance allocations, in which a resource manager or other entity of the provider network is authorized to revoke access to a currently allocated instance, may be termed "interruptible" allocations herein, and the corresponding instances may be termed "interruptible" instances.

During the lifecycle of a give computing platform usable to provide one or more resources of the provider network, several different types of configuration changes may be performed on the platform. In the case of a platform configurable to host one or more virtual compute instances in one embodiment, for example, virtualization software such as a hypervisor may be installed initially on the platform. Various mappings may then be configured between physical and logical resources on the platform in such an embodiment—e.g., how many processor cores are to be dedicated to (or made available to, without necessarily being dedicated to) each instance, how the memory and storage are to be partitioned for different instances, how networking devices are to be mapped to instances, and so forth. After an initial configuration process, the platform may in some embodiments be designated as being in a "normal" or "ready" state, indicating that one or more virtual compute instances (up to some maximum number of instances) can be instantiated or launched on the platform. Depending on various factors such as the arrival rate of client requests to launch new instances, the availability of capacity on other platforms, various platform load balancing policies in effect, and so on, one or more uninterruptible and/or interruptible instances may be launched on the platform. As more instances are launched, the remaining available capacity to launch new instances on that same platform may decrease.

At some point in time, in one embodiment the resource manager or some other administrative entity of the provider network (such as a data center administrator or system administrator) may determine that one or more additional configuration changes are required on the platform, and that performing the additional configuration changes requires that there be no instances running on the platform. For example, a new version of virtualization software may have become available, such that the upgrade to the new version can only be performed after any instances that happen to be instantiated on the platform are terminated. Or, in one embodiment, virtualization mappings may have to be changed to support resource instances of different performance capacities than originally anticipated for the platform; for example, initially the largest compute instance supported may have been allocated four cores on a sixteen-core platform, and an increasing demand for eight-core instances may have led to a need to change core-to-instance mappings. Other examples of configuration changes with a prerequisite that the platform be free of any running instances could include, in some embodiments, changes to the electrical, heating or cooling infrastructure, physical repositioning of the platform's rack or other support, hardware component upgrade or repair (such as a replacement for a failed redundant memory module), or even a decision to repurpose or retire the platform. If, at the time that the decision to implement the configuration change is made, at least one interruptible instance happens to be running on the platform in some embodiments, it may not be possible to initiate the configuration change until all such interruptible instances are terminated. Since, by definition, an interruptible instance is one whose run duration (i.e., the time period for which the instance remains activated and is accessible by the client on whose behalf the instance was launched) is determined by the client to whom the instance is allocated, the resource manager may have little or no influence on exactly when the configuration change can be initiated.

In order to implement the desired configuration change as soon as possible, in such embodiments no additional uninterruptible instance launches may be allowed on the platform until after the planned configuration change has been fully implemented. During the time period between the designation of the platform as being unavailable for additional uninterruptible instance launches, and the time that all the already-launched uninterruptible instances terminate, the platform may be designated as being in a "draining" state in some implementations. (The reason for the use of the term "draining" may become more apparent if the platform is considered as an instance "container" which "fills up" as more and more instances are launched on it. In this view, after the decision that a configuration change is needed is made, the set of launched uninterruptible instances has to "drain" out of the container, before the container can be reconfigured and reused as desired.)

In order to be designated as being in the draining state, in one embodiment the platform may have to meet these conditions: (a) at least one uninterruptible instance is currently being hosted on the platform and (b) no additional uninterruptible instance launches are permitted until after all the currently-hosted uninterruptible instances are terminated—that is, the platform is at least temporarily unavailable for additional uninterruptible instances. In large provider networks, which may contain thousands of computing platforms, the number of platforms that are in such a draining state at any given point of time may be quite substantial. Furthermore, at least some of the platforms in draining state may have sufficient unused or idle capacity available to host other, preferably interruptible instances. For example, a sixteen-core platform in a draining state may have one running uninterruptible instance, to which four cores are allocated; this may leave twelve cores unused, which could be used for other purposes such as interruptible instances. The total unused capacity, summed over all the draining state platforms of a given large provider network, may in some embodiments be enough to generate a substantial amount of revenue for the provider network operator if it were possible to monetize that unused capacity for interruptible instances. As soon as a particular platform exits the draining state, when all its uninterruptible instances are relinquished by the clients to whom they were allocated, any additional interruptible instances that were launched on the platform while it was draining may also be terminated, and the desired configuration change may be initiated. After the desired configuration change is completed, the platform may once again enter "normal" state and become available for additional uninterruptible and/or interruptible instances.

Accordingly, in some embodiments, the resource manager may be operable to determine that a particular computing platform of the provider network is in a draining state. In accordance with its designation as being in the draining state, the platform may be currently hosting at least one uninterruptible resource instance and may be temporarily unavailable to launch additional uninterruptible resource instances. In response to (a) a determination that the platform in the draining state has sufficient available computing capacity for at least one resource instance and (b) an instance activation request from a client, the resource manager may launch an interruptible resource instance on the platform. The resource manager may establish any combination of several different pricing policies to be used for the interruptible instances that may be launched on draining-state platforms in a particular embodiment. In some embodiments, the resource manager may establish different revocation policies to be used for the interruptible instances, indicating for example whether the client to whom an interruptible instance is provided a notification before the instance is terminated, or whether the client is guaranteed access to the instance for a minimum duration before potentially being interrupted, and so on.

In some embodiments, dynamically resizable pools of resource instances may be set aside for at least some of the different instance types or modes—e.g., long-term reserved instances may be allocated from one pool, on-demand instances from another, and so on. In some such embodiments, the collection of draining-state platforms may be considered another distinct resource pool, from which an additional category of instance (which may be termed draining-mode instances or draining-state instances) can be allocated. The collection of resources used for each of the instance types or modes, together with the specific pricing and revocation policies in use for the collection, may be termed a "marketplace" in this document. The on-demand marketplace, for example, in one implementation may include a pool of resources instances currently being used in on-demand mode, as well as other instances set aside as a buffer for additional on-demand requests. The draining-state marketplace may include instances that can be hosted by a dynamically changing set of draining-state platforms. Depending on the implementation, the spot marketplace may comprise a set of instances currently in use in spot mode, as well as some reserved instance slots (i.e., logical representations of reservations) that happen not to be activated currently, but for each of which an instance could be launched at short notice if the reserving client requested an instance activation. In some embodiments, at least a portion of the draining-state pool may be usable for spot instances as well. A reserved instance marketplace may in one implementation include active instances (activated as a result of the reserving clients' requests) as well as reservation slots that have been assigned to clients but do not currently have corresponding active instances. The resource manager may not have complete control over the size of the draining-state pool in some embodiments (since the transition out of draining state may depend on client decisions to terminate or relinquish uninterruptible instances). The resource manager may, however, move resources in and out of several of the other marketplaces in some embodiments, and may adjust the prices of the various instances and reservations corresponding to each marketplace based on a combination of factors including the pricing policies being enforced in the provider network, as well as based on supply and demand.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). Some clients may wish to specify the locations at which their resources are reserved and/or instantiated, e.g., at either the region level, the availability zone level, or a data center level, to maintain a desired degree of control of exactly where various components of their applications are run. Other clients may be less interested in the exact location where their resources are reserved or instantiated, as long as the resources meet the client requirements, e.g., for performance, high availability, supported software levels, and so on. The marketplaces for the various types of instance acquisition modes (e.g., draining-mode, spot, on-demand and reserved instance) may in some embodiments also be organized based on the geographical locations, regions, or availability zones: i.e., the draining-mode market for one availability zone may be considered distinct, and may have prices and resource inventory independent from, the spot market in a different availability zone.

Prior to launching an interruptible resource instance on a draining-state platform on behalf of a client, the resource manager may in some embodiments provide an indication to the client of a pricing policy in effect for using interruptible resource instances on computing platforms in the draining state. In some embodiments the client may be allowed to choose which pricing policy, from among a set of alternative pricing policies available, the client wishes to use. Depending at least partly on the pricing policy used, the resource manager may determine a billing amount associated with the interruptible resource instance to be charged to the client. A pricing policy may comprise one or more pricing components, each of which may be based on any of a number of different factors in various embodiments. For example, in one embodiment, a pricing component may be based on an estimated supply of computing capacity for interruptible instances, an estimated demand for interruptible instances, an estimated duration for which an uninterruptible instance on the targeted computing platform is expected to remain active, a fixed price established by the resource manager for interruptible instances, or a current spot price of a resource instance available in a spot-pricing marketplace implemented for the provider network. In some implementations, the resource manager may use historical instance usage information (e.g., how long the client that owns an uninterruptible on-demand instance typically uses such instances before relinquishing them) and/or reservation term duration information, to estimate how long the platform is likely to remain in draining state, and use such estimates to help determine pricing components for the interruptible instances. If it estimates that the platform is likely to remain in the draining state for a long time, the resource manager may be able to allow interruptible instances on the platform to remain active for longer periods, and may be able to charge a higher price, for example, than if it expects the platform to exit its draining state fairly quickly. In one embodiment where prices for draining-state instances are set dynamically according to bids received from clients (as in the more general spot market), if a new request for a draining-state instance is received and has a higher bid than the price currently assigned to an existing draining state instance, the existing instance may be terminated and a new instance launched at the higher bid price.

The resource manager may also provide indications to clients of the details of the revocation policy applicable to revoking access to draining-state instances in some embodiments. For example, in one embodiment, the revocation policy may specify the length of a time interval for which the client is to be allowed access to the interruptible resource instance launched on a draining-state platform after an access revocation notification is sent to the client. In one implementation access revocation notifications may not be provided to clients, in which case the revocation policy may indicate that access to the interruptible resource instance is to be revoked without any notification. In another implementation access to draining-state interruptible instances may be provided in discrete time units (such as ten-minute periods or 30-minute periods)—e.g., the client may be informed that, even though the draining-state instance is likely to be interrupted eventually, the client would still be allowed to retain access to the instance for a specified minimum time period.

After determining that all the uninterruptible instances on the draining-state platform have terminated, the resource manager may in one embodiment begin revoking access to (and/or terminating) any interruptible instances that were launched during the draining state, in accordance with the details of the revocation policy in place. After all the interruptible instances have also been terminated, the platform may be designated as being in the "normal" state again, i.e., available for launching additional uninterruptible instances. In some embodiments, one or more programmatic interfaces (such as web pages, command-line interfaces, or application programming interfaces (APIs)) may be implemented to allow clients to view and/or select pricing policies or revocation policies. Such interfaces may also allow clients to specify notification mechanisms to be used by the resource manager to inform the clients when access to the instances is going to be revoked (if a revocation policy that requires notification to be provided to the client is in effect) in some embodiments.

Example System Environment

FIG. 1 illustrates an example system environment, according to at least some embodiments. The system 100 includes a provider network 110 with a plurality of computing platforms 120, such as platform 120A, 120B, 120C and 120D. Each platform 120 has a corresponding total resource capacity, and is configurable to deploy part or all of that capacity to host one or more resource instances. System 100 also includes a resource manager 180 and an interface manager 182. Each platform 120 is designated as being in one of a plurality of platform states 150, such as, for example, "normal" state or "draining" state, which are described below in further detail. The capacity of a platform may include, for example, a set of processors or processing cores, one or more memory components, storage components, network components and the like. Different platforms may have different total capacity in some implementations; in other implementations all of the platforms 120 may have the same total capacity, or a small set of platform capacities may be supported (e.g., each server may comprise wither eight cores or sixteen cores in such an implementation). At any given time, a given platform 120 of system 100 may be hosting zero or more uninterruptible resource instances 130 (such as instance 130A being hosted on platform 120A), and zero or more interruptible instances (such as instance 132D on platform 120B), on behalf of one or more clients 148, such as clients 148A and 148B. An uninterruptible instance, as noted earlier, may be defined as an instance that remains allocated and accessible to a client until that client relinquishes access or terminates the instance (e.g., by sending an instance termination request or shutdown request to the resource manager 180); thus, for an uninterruptible instance, the time at which the instance is terminated or access is relinquished is determined by the client to whom it is allocated. An interruptible instance may be defined as one to which access (by the client to whom the instance is allocated) can be revoked by the resource manager, e.g., before the client voluntarily relinquishes access after completing the tasks for which the instance was acquired; thus, the time for which the interruptible instance remains active and accessible may be determined at least in some cases by the resource manager rather than the client.

The total capacity of a platform 120 may thus be divided into three categories in the depicted embodiment: a set of zero or more uninterruptible instances 130 (abbreviated as "U-Inst" in FIG. 1), a set of zero or more interruptible instances 132 (abbreviated as "I-Inst"), and the remaining unused or available capacity 140. In the case of platform 120A, for example, the available capacity 140A may represent the difference between (a) the total capacity of the platform 120A and (b) the sum of the capacity used for U-Inst 130A and I-Inst 132A. Similarly, platform 120B has available capacity 140B, and is hosting U-Insts 130K, 130L, and 130M, and I-Insts 132D and 132E. Platform 120D has three active U-Insts 130P, 130Q and 130R, three active I-Insts 132L, 132M and 132N, and no unused capacity; i.e., all the capacity of platform 120D is currently being used for active instances. Platform 120C has just one U-Inst 130W, and available capacity 140C.

Some of the platforms 120, such as platforms 120B and 120D with respective state indicators 150B and 150D, are depicted in FIG. 1 as being in a "normal" state, while other platforms, such as 120A and 120C, are shown as being in "draining" state. As noted earlier, a platform 120 may be designated as being in a draining state in the depicted embodiment if (a) there is at least one active uninterruptible instance 130 currently being hosted or run on that platform 120 and (b) the platform is at least temporarily designated as unavailable for additional uninterruptible instances. One reason that the platform may be unavailable for additional uninterruptible instance is that a configuration change (such an upgrade to virtualization software, a change to the set of instance sizes to be supported on the platform, or a hardware upgrade or module replacement) is to be performed on that platform, where the configuration change cannot be performed until all the uninterruptible instances currently being hosted on the platform terminate. In the depicted embodiment, a platform 120 which is available (assuming sufficient unused capacity) for a launch of an additional uninterruptible instance 130 may be designated as being in "normal" state. Note that a platform 120 in the normal state may only be able to host an additional uninterruptible instance if sufficient available capacity exists—e.g., even though platform 120D is in the normal state, it has zero available capacity, so no new instances may be launched on platform 120D until at least some of its capacity is freed up.

Resource manager 180 in the depicted embodiment may be configured to support launches of interruptible instances 132 on unused capacity of draining-state platforms 120. The resource manager 180 may be operable to determine that a particular platform 120 is in a draining state, e.g., by looking up status information 150 for the platform 120 (which may be available in a resource management database 190 in some implementations), or because the resource manager 180 itself participated in the decision to designate the platform as being in draining state. In response to determining that the platform 120 is in the draining state, and has sufficient available capacity 140 to host a new instance, the resource manager 180 may launch an interruptible instance 132 on the platform in response to an instance activation request from a client 148.

Interface manager 182 may serve as an intermediary between clients 148 and the resource manager 180, e.g., by implementing one or more programmatic interfaces (such as web pages, APIs, command-line tools or graphical user interfaces) that can be used by the client to submit requests and view information about resource instances, and/or by the resource manager 180 to respond to client requests and provide instance information. In some embodiments the interface manager 182 may be implemented as a subcomponent of resource manager 180. It is noted that at least in some embodiments, clients 148 may be unaware of any details regarding platforms 120, such as exactly which platforms 120 are being used for the instances currently allocated to them, or even the characteristics or properties (such as hardware vendor, CPU or core speed, and so on) of any platforms 120 of the provider network 110. In some embodiments the draining-state capacity may simply be added to the overall capacity available to the resource manager for one or more instance types (e.g., for spot-priced instances), and clients 148 may not be informed of whether draining-state platforms are being used for their instances.

The resource manager 180 may provide information (e.g., via one or more of the programmatic interfaces implemented by interface manager 182) about the pricing models or policies being implemented for various instance types to clients—e.g., the different pricing options that the clients 148 may have for uninterruptible instances 130 and interruptible instances 132. Examples of some pricing policies are described in further detail below in conjunction with the description of FIGS. 2a and 2b. In addition, in some embodiments the resource manager 180 may provide details of various revocation policies available, such as whether notifications are provided to clients before their instances are interrupted, and if so, how long before access is revoked to the instances. In embodiments where access revocation notifications are provided to clients 148 before their instances are interrupted, the resource manager may allow the clients to choose among several supported notification mechanisms. After all of the uninterruptible instances 130 on a given platform 120 have been terminated, e.g., at the request of the clients to whom the uninterruptible instances were launched, the resource manager 120 may terminate any interruptible instances on the platform 120 in some embodiments. After all the interruptible and interruptible instances on the platform 120 have been terminated, in embodiments where a desired configuration change or changes led to the designation of the platform 120 as being in draining state, the desired configuration changes may be applied, and the platform 120 may be returned to a normal state such that new uninterruptible instances 130 can be launched. In some implementations the resource manager 180 itself may be responsible for designating and/or changing platform states; in other embodiments, other entities of provider network 110 may be responsible for state changes and designation. In one implementation at least some of the configuration changes that lead to draining state designations may be initiated, performed or scheduled by the resource manager 180. Resource manager 180 may store various types of data and metadata related to managing draining-state platform capacity in resource management database 190 in some embodiments. In addition the functionality related specifically to draining-state platforms, the resource manager 180 may also perform a number of other tasks in various embodiments, such as receiving and responding to queries and requests about available resources and reservations, status of existing instance allocations, and the like.

Resource Instances Categories and Associated Pricing Models

Figure 2A:
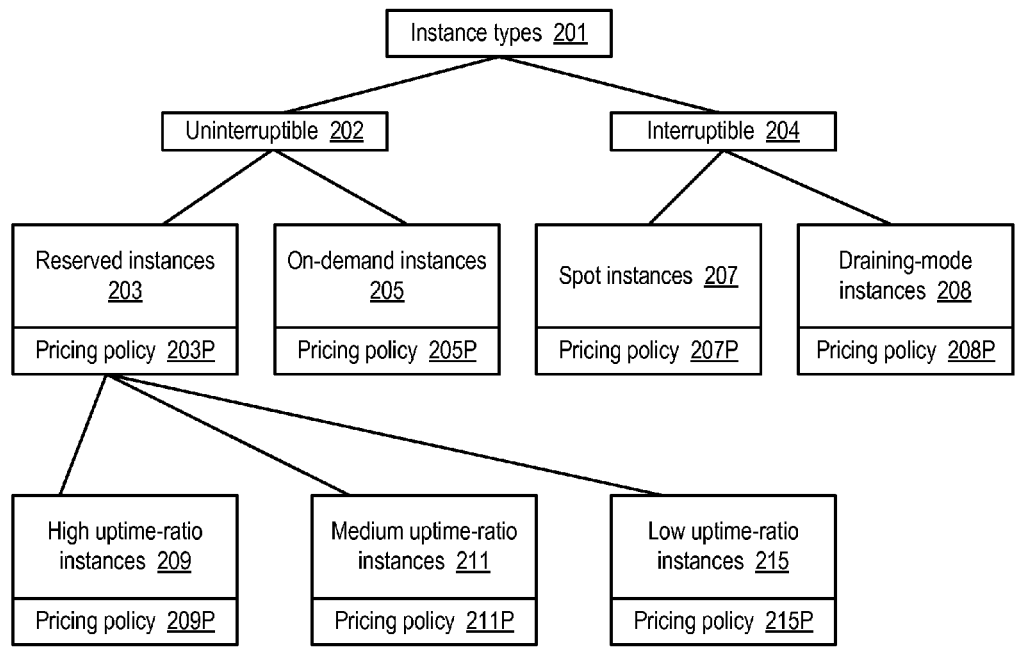
FIGS. 2a and 2b illustrate example resource instance classification approaches, according to at least some embodiments.
Figure 2B:
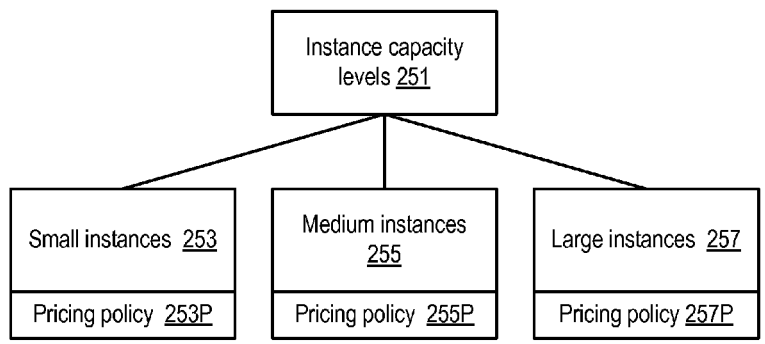

The resource instances of the provider network 110 may be grouped into classes or categories based on several different dimensions in some embodiments, and the pricing policies associated with different classes may differ. FIGS. 2*a* and 2*b* illustrate example resource instance classification approaches, according to at least some embodiments. FIG. 2*a* illustrates an approach in which instances are classified based in part on the timing or duration of instance allocations—i.e., on when instances are obtained by clients and when client access to the instances is revoked. Instance types 201 in the depicted embodiment are classified as being either uninterruptible 202 or interruptible 204. Uninterruptible instances 202 may include reserved instances 203, and on-demand instances 205; interruptible instances may include spot instances 207 and draining-mode instances 208 (i.e., instances activated on platforms 120 that are in draining state). Each instance type may have a respective pricing policy, such as policies 203P for reserved instances, 205P for on-demand instances, 207P for spot instances, and 208P for draining-mode instances. In one embodiment, a client 148 may acquire a reserved instance 203 for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205, spot instances 207, or draining-mode instances 208. The pricing policy 205P for on-demand instances 205, available for example from an on-demand instance marketplace, may allow the client 148 to pay for resource capacity by the hour with no long-term commitment or upfront payments, and may support the retention of an allocated instance by the client 148 for as long as the client wishes to extend the allocation at the on-demand price. The client 148 may decrease or increase the resource capacity used, based on application needs, and may only have to pay the hourly rate for the instances used for as long as the client wishes to use them. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances.

Spot instances 207 may provide another type of resource purchasing and allocation model, and may be obtained from a separately maintained spot marketplace in some embodiments. The spot pricing policy 207P may allow a client 148 to specify the maximum price that the client is willing to pay (e.g., per minute or per hour), and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down). In some embodiments instances that have been reserved by one client but have not yet been activated may be used for the spot market. As soon as a reservation owning client requests an activation of an instance for a reserved instance that is currently in use by a spot-market customer in such an embodiment, the allocation of that instance to the spot-market customer may be interrupted so that the reservation can be activated.

A number of different pricing policies 208P may be implemented for draining-mode instances 208 in some embodiments. In one embodiment, a bid-based approach may be used, similar to the spot-pricing approach described above, in which prices for draining-mode instances may be based on demand and supply, and an allocation provided to a client 148 at a particular bid price may be interrupted if a higher bid is received. In another embodiment, the resource manager 180 may also or instead set a price for a draining-mode instance based on an estimate of how long the platform 120 is expected to remain in draining state. The resource manager 180 may compute such estimates based on historical usage statistics—e.g., if a particular client 148 typically uses an on-demand instance for approximately six hours before relinquishing the instance, and that client 148 has used an on-demand instance on a draining-state platform 120 for three hours, the resource manager may estimate that the platform is likely to remain in draining state for three more hours, and price instances using the available capacity on that platform based at least partly on that estimate. In some simple implementations a fixed price may be charged for the use of draining-mode instances. In another implementation, the current spot price may influence the pricing of draining-mode instances, e.g., in order to attract clients 148 to draining-mode instances, the resource manager 180 may attempt to keep the draining-mode price slightly lower than the spot price as far as possible. In one embodiment, all the available capacity from draining-state platforms 120 may simply be added to the spot marketplace; i.e., the same pricing policies 207P that apply to spot instances in general may be applied to interruptible instances launched on draining-state platforms 120.

The prices of various types of instances may also vary based on the availability zones or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs. Separate marketplaces or marketplace partitions may be set up for reservations of the different uptime ratios supported in some embodiments.

Instance pricing may also vary based on other factors. For example, in the case of compute instances, the performance capacities of different CPUs and other components of compute servers such as memory size may come into play. FIG. 2b shows an example classification of compute instances based on instance performance ratings or capacity levels 251. Large instances 253 may have more computing capacity than medium instances 255, which in turn may have more computing capacity than small instances 257. Accordingly, different pricing policies 253P, 255P and 257P may be implemented for the different sizes of instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. Some or all of the pricing information may be stored in resource management database 190 in some embodiments by resource manager 180. Separate sets of APIs may be implemented for each type of instance in some embodiments.

Example Timeline of Platform State Changes and Instance Launches

Figure 3:
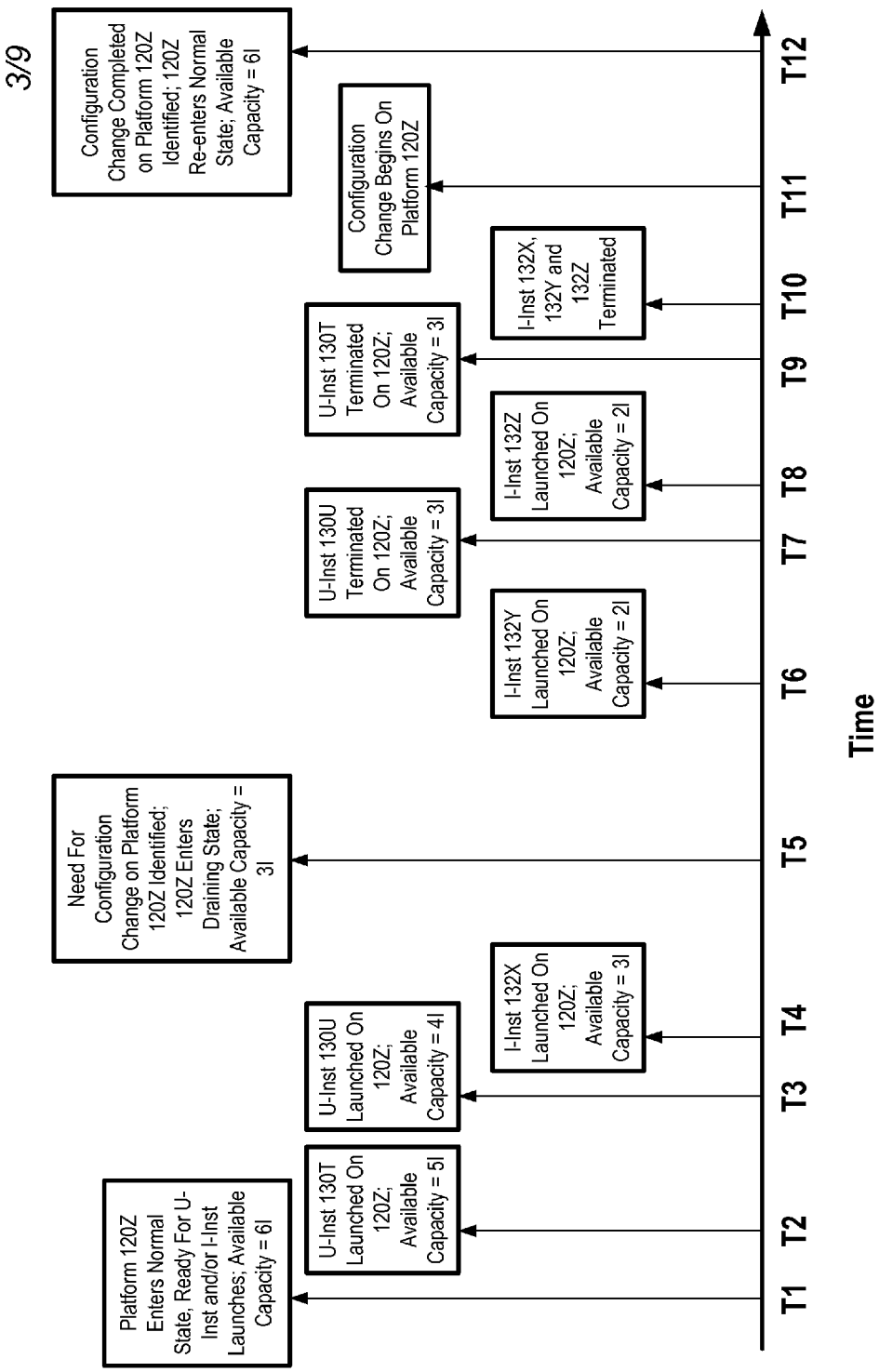
FIG. 3 illustrates an example timeline that shows a sequence of instance launches and platform state changes, according to at least one embodiment.

FIG. 3 illustrates an example timeline that shows a sequence of instance launches and platform state changes, according to at least one embodiment. At time T1 in the example timeline, a platform 120Z with a total capacity of 6I (i.e., six instances of equivalent performance capacity) enters normal state, i.e., platform 120Z is determined to be ready to host uninterruptible as well as interruptible instances. At time T2, an uninterruptible instance 130T is launched on platform 120Z, e.g., by resource manager 180 in response to a request for an on-demand instance from a client 148K. After instance 130T is launched, the available capacity on platform 120Z shrinks to 5I (since one of the maximum of six instances supportable has been instantiated). Similarly, at time T3, another uninterruptible instance 130U is launched on behalf of client 148L, and the remaining available capacity goes to 4I. At time T4, in response to a launch request from a client 148M, an interruptible instance 132X is launched on platform 120Z, further reducing the available capacity to 3I.

At time T5, a need for a configuration change for platform 120Z is identified, such that the change cannot be initiated until all instances on platform 120Z are terminated. Platform 120Z is designated as entering draining state; no new uninterruptible instances are allowed on platform 120Z until the configuration change has been completed. The available capacity remains 3I, thus providing resource manager 180 the opportunity to launch up to three additional interruptible instances on platform 120Z while it remains in the draining state. Accordingly, in response to a request for an instance launch from a client 148N, at time T6 an interruptible instance 132Y is launched on platform 120Z, reducing available capacity to 2I.

At time T7, client 148L, to whom uninterruptible instance 130U is allocated, terminates instance 130U. The available capacity rises to 3I; platform 120Z remains in draining state because there is still one uninterruptible instance (130T) running. At time T8, the resource manager 180 launches another interruptible instance 132Z, reducing the available capacity to 2I. At time T9, client 148K terminates the last remaining uninterruptible instance 130T, increasing the available capacity to 3I once more. The resource manager 180 determines that there are no uninterruptible instances active on platform 120Z, so that, as soon as the interruptible instances currently active on platform 120Z are terminated, the desired configuration change identified at T5 may be initiated.

Accordingly, at time T10 in the example timeline, the resource manager 180 terminates interruptible instances 132X (which was launched before the platform entered draining state), 132Y and 132Z. In some implementations, and according to the details of the revocation policies in use for the instances 132X, 132Y and 132Z, the three interruptible instances may not be terminated at exactly the same time—e.g., the resource manager may have to notify the respective clients to whom the instances are allocated of a pending termination, and/or different respective delays may be required before the instances can be terminated. After all the instances have been terminated, at time T11 the implementation of the configuration change may be initiated. Once the configuration change is completed at time T12, the platform 120Z may be designated as being in normal state once again, and new uninterruptible (or interruptible) instances may be launched on the platform. In one implementation, the platform may be considered to remain in draining state between T5 and T12; in another implementation, the draining state may be deemed as having ended at T9, as soon as all uninterruptible instances are terminated.

In some implementations, the resource manager 180 may not necessarily wait for interruptible instances 132X, 132Y and 132Z to be terminated, before allowing or initiating the configuration change. In one such scenario, for example, the configuration change itself may trigger the termination of any running instances—e.g., if an old power supply is being replaced by a new one on platform 120Z, or a damaged memory board is being replaced by a new memory board, the removal of the old component may cause active instances to terminate.

Example Interactions Between Clients and Resource Managers

Figure 4:
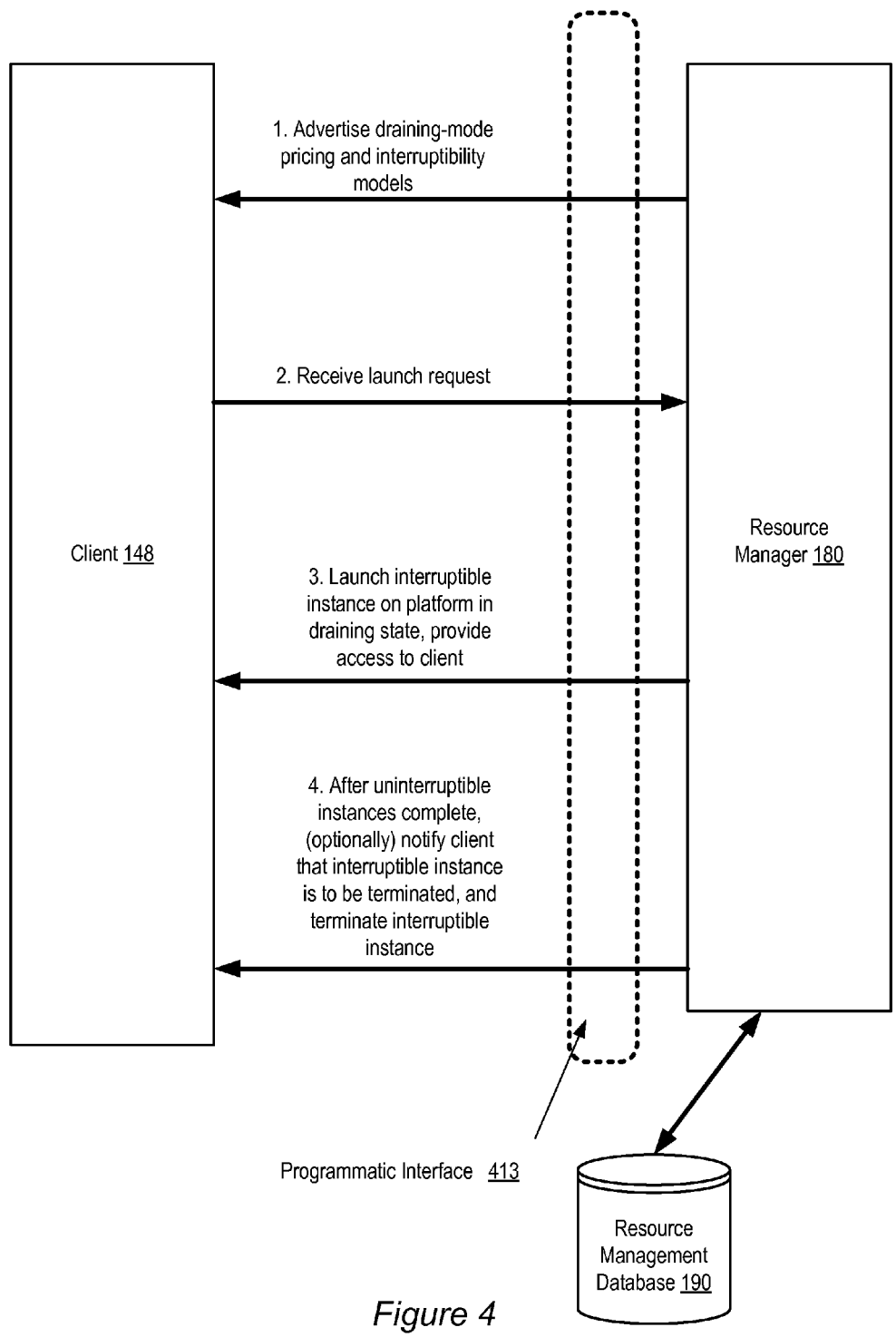
FIG. 4 illustrates example interactions between a client and a resource manager regarding the use of draining-mode instances, according to at least one embodiment.

FIG. 4 illustrates example interactions between a client and a resource manager regarding the use of draining-mode instances, according to at least one embodiment. As shown by the arrow labeled "1" in FIG. 4, the resource manager 180 may advertise the availability of draining-mode instances, e.g., by including such instances in a list of supported instance types viewable via a programmatic interface 413 such as a web site or a set of APIs. Information about the pricing policies and revocation policies applicable to draining-mode instances may also be supplied to clients by the resource manager 180 in some embodiments, e.g., using the same interface 413 or a different interface. In some embodiments, as noted earlier, draining-mode instances may simply be included in a spot marketplace, in which case the availability of capacity for draining-mode instances may simply be reflected in the overall spot price that the clients 148 may view using an interface 413. In many embodiments platform-level details may not be exposed to clients—i.e., while clients may be informed that draining-mode instances are available, exactly which platforms 120 are to be used for such instances may not be revealed.

As indicated by the arrow labeled "2", the resource manager 180 may receive an instance launch request from a client 148. In some implementations, clients may specify that they wish to acquire a draining-mode instance, and specify the pricing policy and/or revocation policies they would like to apply for the instance. In other implementations, the client's request may simply indicate a willingness to accept an interruptible instance, and the resource manager 180 may determine whether a draining-mode instance is to be launched, or whether some other interruptible instance such as an instance obtained from the spot marketplace is to be launched. The request may also indicate other preferences to be taken into account by the resource manager 180, such as a desired instance size or performance capacity, a desired availability zone or location, a desired software stack, and so on.

If the resource manager 180 finds unused capacity at a draining-state platform 120 that can be used for the client's request, an interruptible instance may be launched on such a platform, as indicated by the arrow labeled "3". After the instance has been launched, the client may be provided access to it, e.g., by specifying one or more IP (Internet Protocol) addresses that the client 148 can use to communicate with the instance, and/or security credentials to use to log in to the instance.

The resource manager 180 may continue to monitor the selected platform, to keep track of the uninterruptible instances that are active. Eventually, all the uninterruptible instances on the platform may be terminated by their respective owner clients. Upon determining that no uninterruptible instances remain, in some embodiments the resource manager 180 may (as indicated by the arrow labeled "4" in FIG. 4) optionally notify the client whose interruptible instance was launched on the platform that its instance is to be terminated. The resource manager 180 may then terminate the interruptible instance.

Methods for Managing Available Capacity on Draining-State Platforms

Figure 5:
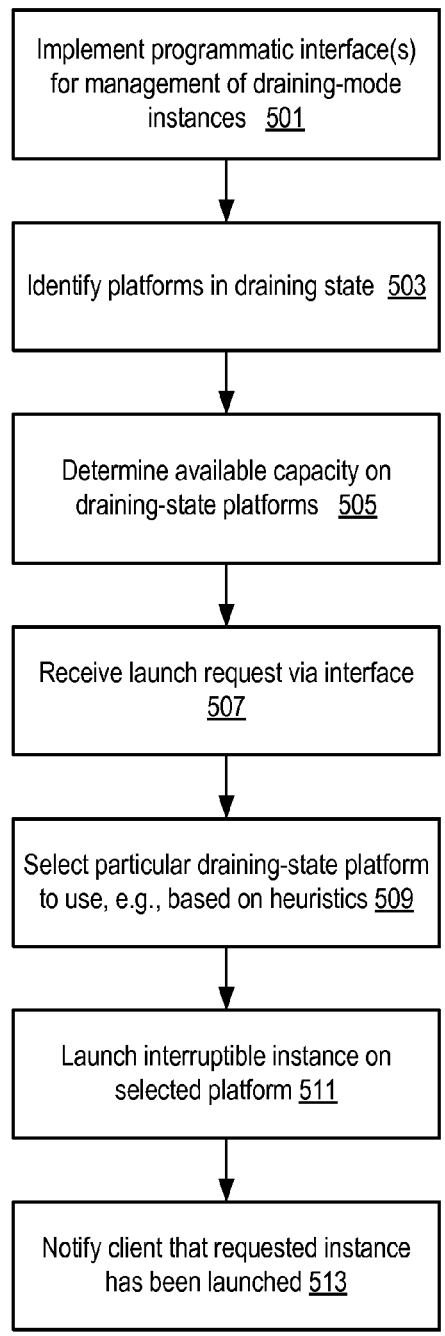
FIG. 5 is a flow diagram illustrating aspects of the operation of a resource manager configured to utilize available capacity on draining-state platforms, according to at least some embodiments.

FIG. 5 is a flow diagram illustrating aspects of the operation of a resource manager configured to utilize available capacity on draining-state platforms, according to at least some embodiments. As shown in element 501, one or more programmatic interfaces may be implemented (e.g., by an interface manager component of the resource manager 180, or by a standalone interface manager 182 separate from the resource manager 180) for operations related to draining-mode instances. The resource manager 180 may identify one or more platforms 120 that are in a draining state at a given point in time (element 503). In some embodiments, the resource manager 180 may itself be responsible for designating platform state changes, e.g., from normal state to draining state and vice versa, and maintaining platform state information in resource management database 190. In other embodiments, an entity separate from the resource manager 180 such as a hardware inventory manager, may maintain platform state information, and the resource manager may query that entity as needed to determine whether any platforms are currently in draining state.

If the resource manager 180 finds at least some platforms in the draining state, in the illustrated embodiment the resource manager 180 may then determine how much available capacity exists on such platforms (element 505). In some implementations, for example, the total capacity of each platform 120 may be available from the resource management database 190 or from a hardware inventory manager, and the resource manager 180 may update a metric indicating the remaining available capacity for a given platform 120 every time an instance is launched or terminated on that given platform. In one implementation, a small set of platform types may be used (e.g., a 16-core server or an 8-core server), with each type capable of hosting a particular number of instances of each supported size, which may make the computation of remaining available capacity fairly straightforward. The resource manager 180 may keep track of the available capacity on draining-state platforms on an ongoing basis in some embodiments, e.g., it may monitor platform state changes and corresponding instance launches/terminations as they occur instead of looking up the information in a persistent repository.

The resource manager 180 may receive an instance launch request from a client 148 (element 507), e.g., via one of the programmatic interfaces, specifying for example the instance size and/or other preferences such as pricing preferences or bids, revocation preferences, and so on. If sufficient capacity is available on at least one draining-state platform 120 for the type of instance requested, the resource manager 180 may select a particular one of the draining-state platforms on which to launch the requested instance (element 509). In some embodiments, if multiple candidate draining-state platforms are available, the resource manager 180 may use heuristics to decide which one to use. One such heuristic could include, for example, examining records of current or past instance allocations of the requesting client, so that the new instance can be placed on a platform 120 as close as possible to other platforms used by the client (e.g., to minimize network latencies between different instances of the client). Another heuristic could be based on a goal of optimizing draining-state available capacity usage for instance sizes with the highest billing rates. For example, if there are two candidate draining-state platforms A and B, and launching the requested instance on platform B would leave enough available capacity to allow an additional large instance to be launched on either A or B, while launching the requested instance on A would mean that an additional large instance could not be launched on A, the resource manager may choose to launch the requested instance on B. Various other heuristics or algorithms may be used to decide which among a plurality of draining-state instances should be used for a particular launch request.

Having selected the platform 120, the resource manager may launch an interruptible instance on the selected platform 120 on behalf of the client 148 (element 511). In some embodiments, where clients are allowed to specify whether they wish to acquire instances in draining-mode or not, the resource manager may only launch instances on draining-state platform if the requested a draining-mode instance. In other embodiments, even if a client does not explicitly indicate a preference for a draining-mode instance, the resource manager 180 may provide a draining-mode instance to the client if the criteria specified in the instance launch request can be met by using a draining-mode instance. E.g., in one implementation the client may indicate in the request that any type of instance (spot, on-demand, and so on) can be allocated, that interruption of the requested instance are acceptable, and may specify a price or bid that is appropriate for a draining-mode instance. In such a scenario, the resource manager may allocate a draining-mode instance to the client. After the interruptible instance has been launched, the client 148 may be notified (element 513), e.g., an IP address of the launched instance may be provided to the client, and an indication of the active status of the instance may be displayed via one of the programmatic interfaces.

Figure 6:
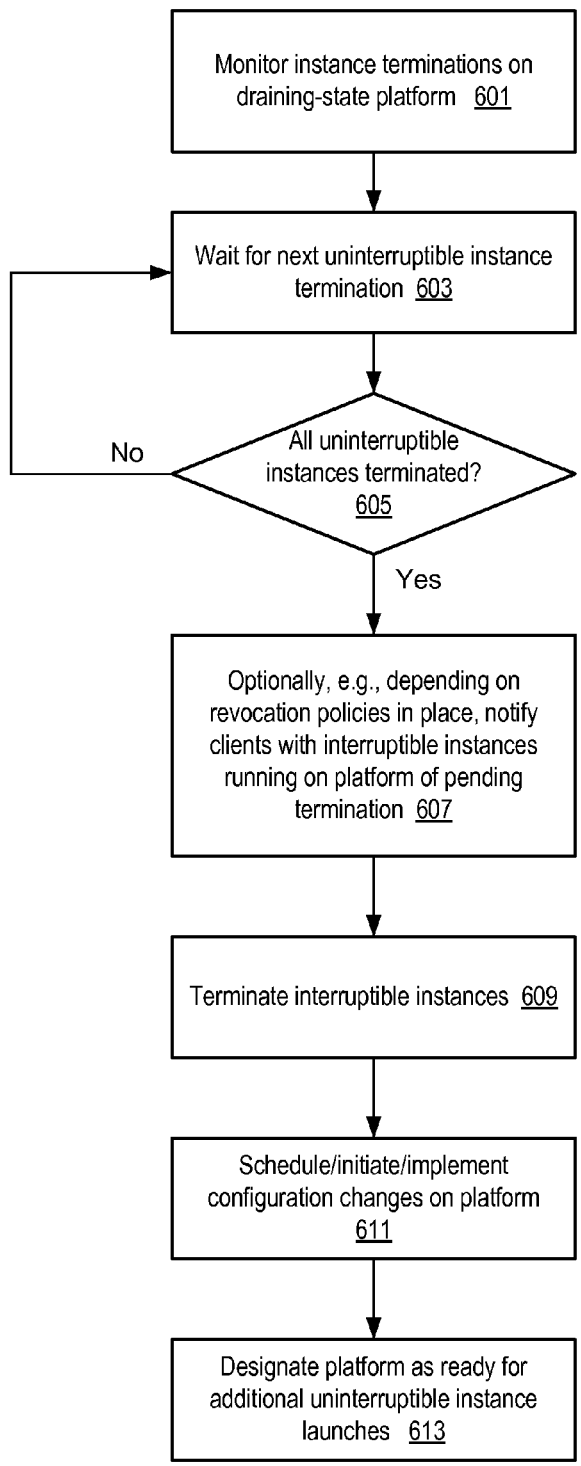
FIG. 6 is a flow diagram illustrating aspects of the operation of a resource manager related to terminating draining-mode instances, according to at least some embodiments.

FIG. 6 is a flow diagram illustrating aspects of the operation of a resource manager 180 related to terminating draining-mode instances, according to at least some embodiments. As shown in element 601, the resource manager 180 may monitor instance terminations on draining-state platforms, and wait until a client 148 terminates an uninterruptible instance 130 on a particular draining-state platform (element 603). If no more uninterruptible instances remain on that platform (as determined in element 605), the resource manager 180 may proceed to deal with any interruptible instances that happen to be active on the platform as described below; otherwise, as indicated by the arrow labeled "No" leading back to element 603, the resource manager 180 may resume waiting for the next termination of an uninterruptible instance on the platform. It is noted that the resource manager 180 may perform various other operations, such as launching new interruptible instances on the platform, responding to queries and reservation requests for various instance types, and so on, while it waits for all the uninterruptible instances to terminate on the platform 120.

After the resource manager 180 determines that all uninterruptible instances on the particular platform 120 have been terminated, the resource manager may turn its attention to any interruptible instances 132 that may be running on the platform. Such instances could, in some embodiments, include one or more draining-mode instances launched after the platform was designated as being in draining state, as well as one or more interruptible instances (such as spot market instances) that happened to be launched before the platform was designated as being in draining state. Depending for example on the specifics of the revocation policies in effect for the different interruptible instances active on the platform, the resource manager 180 may optionally have to notify the corresponding clients regarding the pending termination of their instances (element 607). The interruptible instances may then be terminated (element 609). In some cases, e.g., if the revocation policies in effect allow clients to retain access to draining-mode instances for some interval after the revocation notifications are received by the clients, the resource manager 180 may have to wait for the agreed-upon time intervals before terminating an interruptible instance.

After all the instances (one or more uninterruptible instances, and zero or more interruptible instances) that were running on the draining-state platform 120 are terminated, in some embodiments the desired configuration change or changes that led to the designation of the platform as being in draining-state may be initiated. In one embodiment, depending on whether a desired configuration change is an automatable operation or not, the resource manager 180 may itself initiate, perform or schedule the configuration change (element 611). If a particular configuration change cannot be automated, a data center administrator or systems administrator may be needed to implement the change. After the configuration has been changed as desired, the platform 120 may be designated as being ready for launching new uninterruptible instances in the depicted embodiment (element 613).

Figure 7:
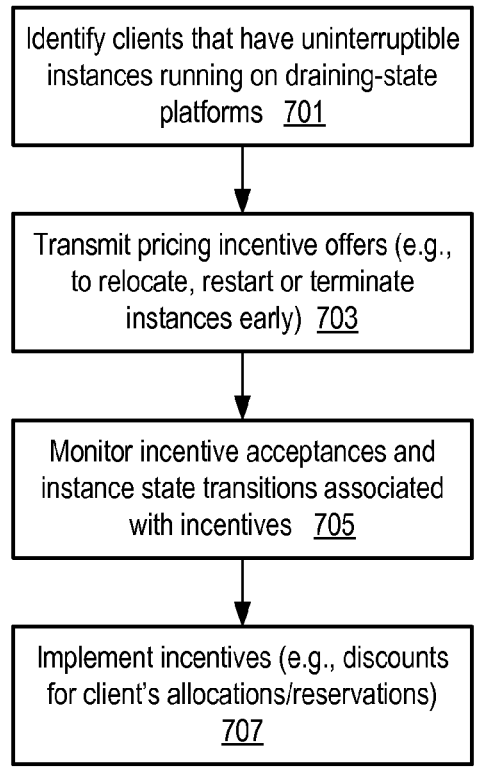
FIG. 7 is a flow diagram illustrating aspects of the functionality of a resource manager related to providing incentives to clients that have uninterruptible instances running on draining-state platforms, according to at least some embodiments.

As indicated above, the duration for which a particular platform 120 remains in draining state (and therefore the amount of time that elapses before a needed configuration change can be performed, and additional uninterruptible instances launched on the particular platform) may be controlled at least in some embodiments by the clients 148 that happen to have running uninterruptible instances on the platform at the time that the platform is designated as being in the draining state. In such embodiments, the clients may not be aware that it might be beneficial from the point of view of the provider network operator and the resource manager 180 if their uninterruptible instances were terminated relatively quickly. FIG. 7 is a flow diagram illustrating aspects of the functionality of a resource manager 180 related to providing incentives to such clients 148 that have uninterruptible instances running on draining-state platforms (e.g., to shorten the duration for which the clients retain access to their uninterruptible instances), according to at least some embodiments. As shown in element 701, the resource manager 180 may identify one or more clients 148 that have uninterruptible instances running on draining-state platforms 120 in one such embodiment. The resource manager 180 may then transmit one or more pricing-related incentive offers to the client or clients, e.g., in an email or via some other notification mechanism (element 703). The pricing related incentives could for example include discounts that may be applied to a client's current or future instance allocations or reservations if the client is willing to relocate an uninterruptible instance identified by the resource manager (e.g. by stopping the instance and then starting an equivalent instance elsewhere), to terminate an uninterruptible instance, or by stopping the instance and then restarting after another notification from the resource manager (e.g., allowing the desired configuration change to be completed). The client 148 may not necessarily be informed about the reason for the incentive in some embodiments, but simply provided an opportunity to receive a pricing benefit if the client is willing to relocate/restart/terminate the identified uninterruptible instance. A deadline period may be indicated in some of the incentive offers in some implementations, e.g., the incentive offer may comprise a message roughly equivalent to "Please terminate instance X before 8 am tomorrow to receive a $Y discount". The resource manager 180 may in some embodiments be responsible for determining one or more of (a) the monetary value or cost to the provider network operator of the platform remaining in draining state for various lengths of time (b) the duration for which the clients running uninterruptible instances on a given platform are expected to retain access to the instances or (c) the monetary value of the discounts or other incentives to offer to such clients.

The resource manager 180 may monitor the acceptance of the incentives, e.g., in the form of affirmative responses to the incentive notifications, and may monitor the uninterruptible instances identified in the incentive notifications, e.g., to verify if and when the clients 148 comply with the conditions indicated in the incentives (element 705). In those cases where a client complies, e.g., by terminating the uninterruptible instance as requested, the resource manager may implement the incentives (element 707)—e.g., by reducing the client's billing amounts for their use of the terminated instance or for their use of some other instance. It is noted that in some embodiments, one or more of the operations shown in FIGS. 5, 6 and 7 may be performed in an order different than that illustrated, or several operations may be performed in parallel. For example, the identification of draining-state platforms and the determination of draining-state available capacity (elements 503 and 505 of FIG. 5) may be performed by one subcomponent of a resource manager, while, in parallel, another subcomponent responds to incoming instance launch requests (elements 507, 509, 511, 513).

Example Web Interface for Draining-Mode Instance Acquisition

FIG. 8 illustrates a portion of an example web-based interface that may be implemented to allow clients 148 to request draining-mode instances, according to some embodiments. Such an interface may be implemented by a standalone interface manager 182 in some embodiments, and by a subcomponent of the resource manager 180 in other embodiments. As shown, the interface may include a web page 800 that includes a message area 803, as well as several form fields in region 805 which may be used by the client 148 to indicate various requirements and/or preferences.

Using field 807 in the depicted example, a client 148 may indicate a desired instance size or performance capability level. A location preference, such as a desired availability zone, region or data center, may be indicated via field 809. The client may indicate the instance type or mode (e.g., reserved, on-demand, spot, or draining-mode) via field 811; in the example shown, the client has opted for a draining-mode instance. Field 813 may be used to indicate the bid or maximum price the client 148 is willing to pay for the instance. In the illustrated embodiment the client may specify an estimate of how long the instance is likely to be used (field 815), which may be useful to the resource manager 180 in selecting the particular draining-state platform to use. Details of the revocation policy preferences of the client may be provided using fields 817 and 819. In field 817, the client may indicate whether advance notice is preferred before the draining mode instance is interrupted or terminated, and in field 819, the client may indicate a preferred notification mechanism (such as a text message or an email). The client may submit the instance request by clicking on button 891 in the depicted example web page 800.

A number of additional and different web pages (or other interfaces such as APIs) may be implemented to support various aspects of functionality provided by a resource manager 180 related to draining-mode instances in various embodiments. For example, one or more web pages may be implemented for incentive offers similar to those discussed earlier in conjunction with the description of FIG. 7. In some implementations multiple programmatic interfaces may be supported for each type of operation supported—e.g., a client may also be able to use one or more APIs directly to submit the kinds of form field contents shown in web page 800.

Example Use Cases

The techniques described above for supporting allocation of draining-mode available capacity to clients in the form of interruptible instances may be useful in a variety of environments. As the total number of distinct platforms provisioned by provider network operators for their data centers rises, the likelihood that a substantial number of pending configuration changes that require the platforms to be in certain well-defined states (e.g., a state where no instances are running) may increase as well. In large provider networks that support interruptible instance allocations, the ability of resource managers to use spare capacity of draining-state platforms may result in significant revenue to the provider network operator.

In many such environments, the pricing for instances launches on draining-state platforms may be set lower than the pricing of other types of instances. Being able to launch instances at low price points may be especially attractive to certain types of customers that wish to run applications whose interruption does not result in much overhead, such as data analysis programs that can start analysis where they left off when interrupted. By utilizing draining-mode capacity in the manner described, the provider network operator may be able to expand its customer base to budget-limited clients, and at the same time increase the overall return on platform investment.

Illustrative Computer System

Figure 9:
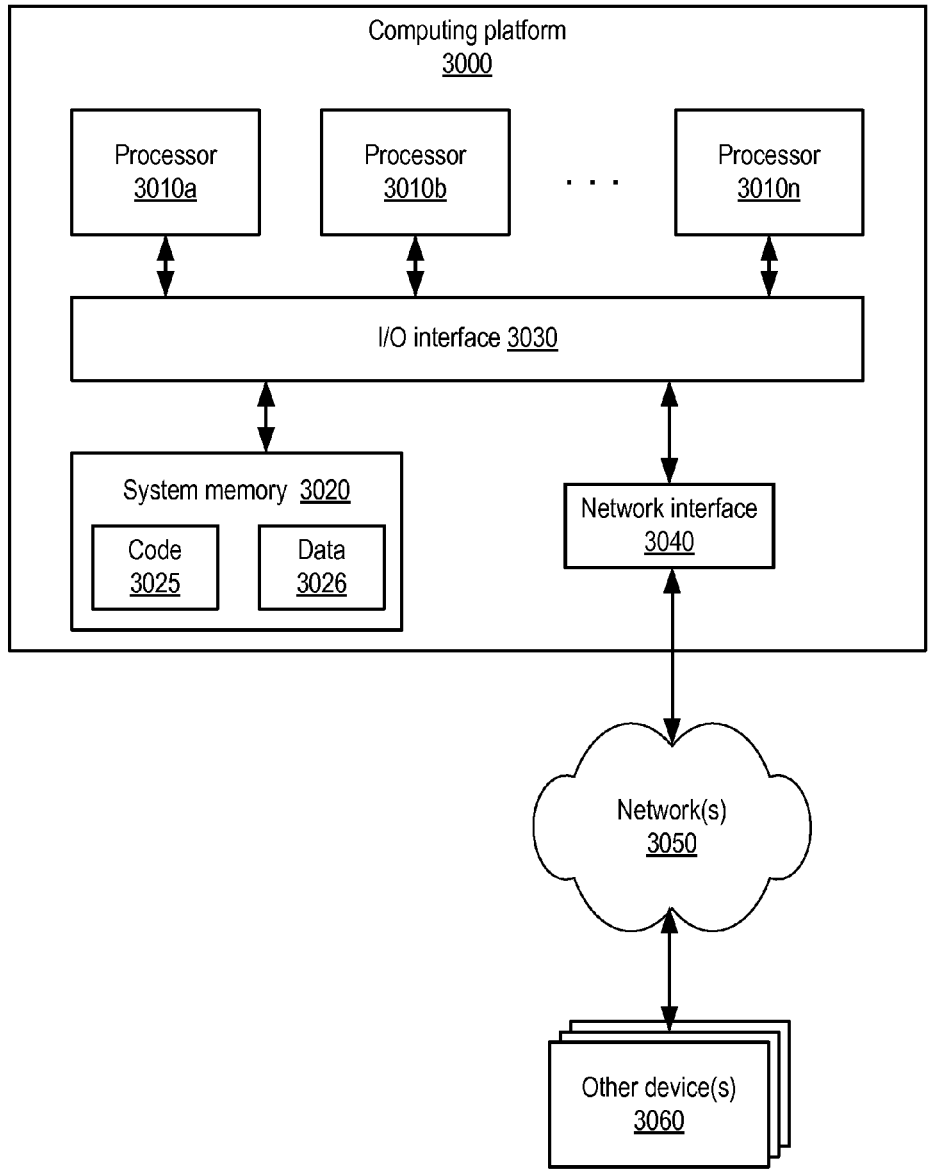
FIG. 9 is a block diagram illustrating an example computing device that may be used in some embodiments.

In at least some embodiments, a server that implements a portion or all of one or more of the technologies described herein, including the techniques to implement the functionality of resource manager 180 and interface manager 182 may include a general-purpose computer system that includes or is configured to access one or more computer-accessible media. FIG. 9 illustrates such a general-purpose computing platform 3000. In the illustrated embodiment, computing platform 3000 includes one or more processors 3010 coupled to a system memory 3020 via an input/output (I/O) interface 3030. Computing platform 3000 further includes a network interface 3040 coupled to I/O interface 3030.

In various embodiments, computing platform 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the platform, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing platform 3000 and other devices 3060 attached to a network or networks 3050, such as other computer systems or devices as illustrated in FIGS. 1 through 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing platform 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing platform 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing platforms such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing platform", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing platforms configurable to host a plurality of resource instances of a provider network; and
one or more computing platforms configured to implement a resource manager;
wherein the resource manager is operable to:
determine that a particular computing platform of the plurality of computing platforms is in a draining state, wherein, in accordance with its designation as being in the draining state, the particular computing platform is currently hosting at least one uninterruptible resource instance and is temporarily unavailable to launch additional uninterruptible resource instances in accordance with its designation as being in the draining state;
in response to (a) a determination that the particular computing platform in the draining state has sufficient available computing capacity for at least one resource instance and (b) an instance activation request from a client, launch an interruptible resource instance on the particular computing platform.

2. The system as recited in claim 1, wherein, prior to launching the interruptible resource instance, the resource manager is further operable to:
provide an indication to the client of a pricing policy associated with using interruptible resource instances on computing platforms in the draining state; and
determine a billing amount associated with the interruptible resource instance to be charged to the client, based at least in part on the pricing policy.

3. The system as recited in claim 2, wherein the pricing policy comprises a pricing component based at least in part on one or more of (a) an estimated supply of computing capacity for interruptible resource instances; (b) an estimated demand for interruptible resource instances; (c) an estimated duration for which the at least one uninterruptible resource instance is expected to remain active; (d) a fixed price established by the resource manager for interruptible instances; or (e) a current spot price of a resource instance available in a spot-pricing marketplace implemented for the provider network.

4. The system as recited in claim 1, wherein, prior to launching the interruptible resource instance, the resource manager is further operable to:
provide an indication to the client of a revocation policy associated with revoking client access to interruptible resource instances launched on computing platforms in the draining state.

5. The system as recited in claim 4, wherein the revocation policy comprises at least one of (a) an indication of a length of a time interval for which the client is to be allowed access to the interruptible resource instance after an access revocation notification is sent to the client (b) an indication that access to the interruptible resource instance is to be revoked without an access revocation notification to the client (c) an indication of a minimum time period for which the client is to be allowed to access the interruptible resource instance.

6. The system as recited in claim 1, wherein the resource manager is further configured to:
determine, after the interruptible resource instance has been launched, that each uninterruptible resource instance of the at least one uninterruptible resource instances has been terminated; and,
revoke access by the client to the interruptible resource instance.

7. A method, comprising:
identifying a particular computing platform of a plurality of computing platforms of a provider network that is in a draining state, wherein, in accordance with its designation as being in the draining state, the particular computing platform is temporarily unavailable to launch additional uninterruptible resource instances at least until an uninterruptible resource instance currently being hosted on the particular computing platform on behalf of a current client is terminated by the current client; and in response to an instance activation request from a second client, launching an interruptible resource instance on the particular computing platform while the particular computing platform is in the draining state.

8. The method as recited in claim 7, further comprising:
designating the particular computing platform as being available to launch additional uninterruptible resource instances after a configuration change is implemented on the particular computing platform, wherein implementation of the configuration change requires that no resource instance be running on the particular computing platform when the configuration change is initiated.

9. The method as recited in claim 7, further comprising, prior to launching the interruptible resource instance:
providing an indication to the second client of a pricing policy associated with interruptible resource instances; and
determining a billing amount associated with the interruptible resource instance to be charged to the second client, based at least in part on the pricing policy.

10. The method as recited in claim 9, wherein the pricing policy comprises a pricing component based at least in part on one or more of (a) an estimated supply of computing capacity for interruptible resource instances; (b) an estimated demand for interruptible resource instances; (c) an estimated duration for which the uninterruptible resource instance is expected to remain active; (d) a fixed price established for interruptible resource instances; or (e) a current spot price of a resource instance available in a spot-pricing marketplace implemented for the provider network.

11. The method as recited in claim 7, further comprising, prior to launching the interruptible resource instance:
providing an indication to the second client of a revocation policy associated with terminating interruptible resource instances.

12. The method as recited in claim 11, wherein the revocation policy comprises at least one of (a) an indication of a length of a time interval for which the second client is to be allowed access to the interruptible resource instance after an access revocation notification is sent to the second client (b) an indication that access to the interruptible resource instance is to be revoked without an access revocation notification to the second client (c) an indication of a minimum time period for which the second client is to be allowed to access the interruptible resource instance.

13. The method as recited in claim 7, further comprising:
determining, after the interruptible resource instance has been launched, that no uninterruptible resource instances remain on the particular computing platform; and,
terminating the interruptible resource instance to allow a configuration change to the particular computing platform to be performed.

14. The method as recited in claim 7, further comprising:
implementing a programmatic interface allowing an indication to be provided of one or more of (a) an availability of computing capacity for one or more interruptible resource instances (b) one or more pricing policies associated with interruptible resource instances or (c) one or more revocation policies associated with revoking access to interruptible resource instances.

15. A non-transitory computer-accessible storage medium storing program instructions that when executed on one or more processors:
identify a particular computing platform of a plurality of computing platforms of a provider network that is in a draining state, wherein, in accordance with its designation as being in the draining state, the particular computing platform is temporarily unavailable to launch additional uninterruptible resource instances, wherein a portion of a capacity of the particular computing platform is in use for an uninterruptible resource instance of a current client; and
in response to an instance activation request from a second client, launch an interruptible resource instance on the particular computing platform while the particular computing platform is in the draining state.

16. The storage medium as recited in claim 15, wherein the instructions when executed on the one or more processors:
prior to launching the interruptible resource instance, provide an indication to the second client of a pricing policy associated with interruptible resource instances.

17. The storage medium as recited in claim 16, wherein the pricing policy comprises a pricing component based at least in part on one or more of (a) an estimated supply of computing capacity for interruptible resource instances; (b) an estimated demand for interruptible resource instances; (c) an estimated duration for which the uninterruptible resource instance is expected to remain active; (d) a fixed price established for interruptible resource instances; or (e) a current spot price of a resource instance available in a spot-pricing marketplace implemented for the provider network.

18. The storage medium as recited in claim 15, wherein the instructions when executed on the one or more processors:
prior to launching the interruptible resource instance, provide an indication to the second client of a revocation policy associated with terminating interruptible resource instances.

19. The storage medium as recited in claim 18, wherein the revocation policy comprises at least one of (a) an indication of a length of a time interval for which the second client is to be allowed access to the interruptible resource instance after an access revocation notification is sent to the second client (b) an indication that access to the interruptible resource instance is to be revoked without an access revocation notification to the second client (c) an indication of a minimum time period for which the second client is to be allowed to access the interruptible resource instance.

20. The storage medium as recited in claim 15, wherein the instructions when executed on the one or more processors:
determine, after the interruptible resource instance has been launched, that no uninterruptible resource instances remain on the particular computing platform; and,
terminate the interruptible resource instance.

21. The storage medium as recited in claim 15, wherein the instructions when executed on the one or more processors:
implement a programmatic interface allowing an indication to be provided of one or more of (a) an availability of computing capacity for one or more interruptible resource instances (b) one or more pricing policies associated with interruptible resource instances or (c) one or more revocation policies associated with revoking access to interruptible resource instances.

22. The storage medium as recited in claim 15, wherein the instructions when executed on the one or more processors:
implement a programmatic interface allowing the second client to submit an indication of a preferred notification mechanism to be used to send an access revocation notification to the second client prior to terminating the interruptible instance.

23. The storage medium as recited in claim 15, wherein the instructions when executed on the one or more processors:

receive an indication that a different client is willing to pay a higher price for an interruptible resource instance than the second client; and in response to the indication, revoke access by the second client to the interruptible resource instance, and instantiate another interruptible resource instance on the particular platform for the different client.

24. The storage medium as recited in claim 15, wherein the instructions when executed on the one or more processors:

provide an indication to the current client of a pricing incentive available in exchange for a termination of the uninterruptible instance by a specified time.

* * * * *